Nov. 14, 1939.　　　　A. H. LIPSIS　　　　2,180,117
LOCKING DEVICE
Filed Sept. 30, 1937
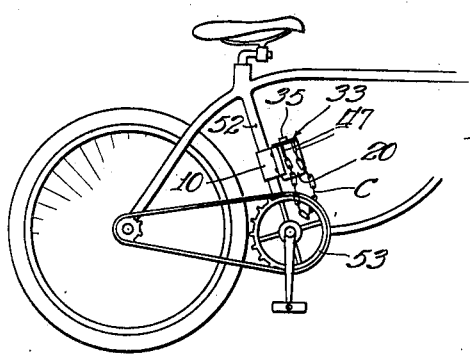
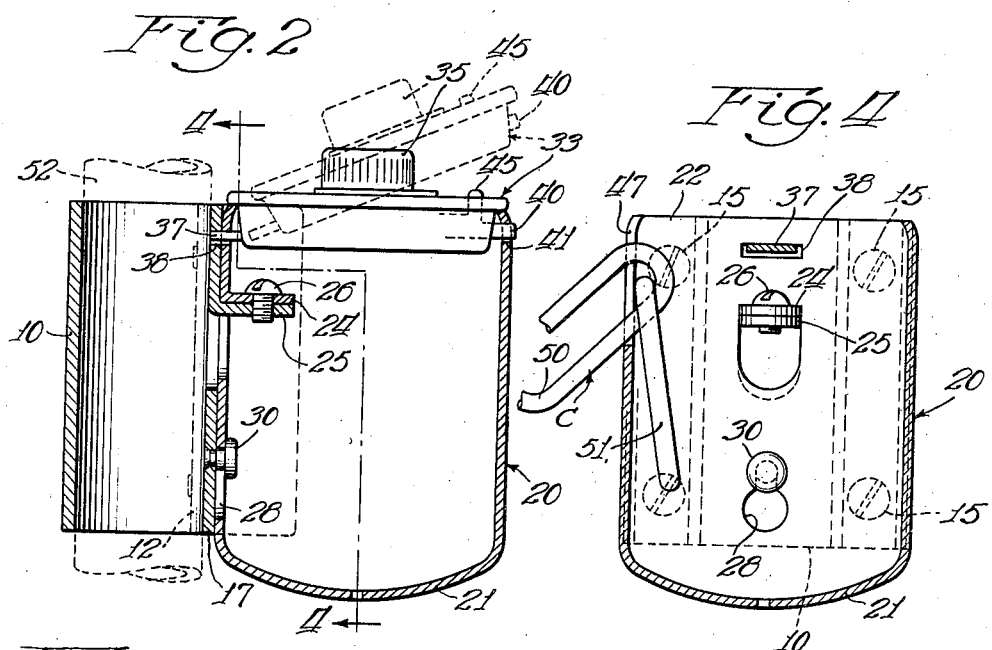
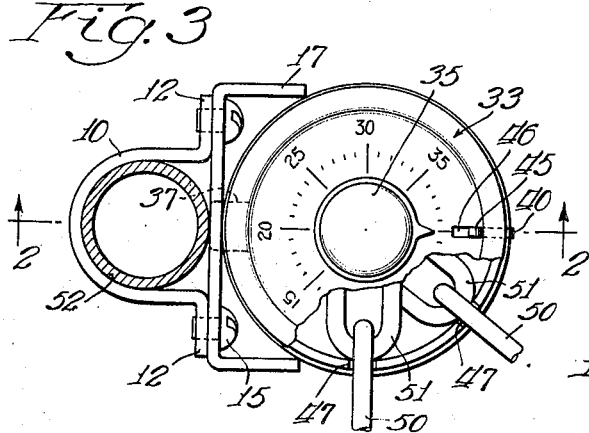
Inventor:
Arthur H. Lipsis Patented Nov. 14, 1939

2,180,117

UNITED STATES PATENT OFFICE 2,180,117

LOCKING DEVICE

Arthur H. Lipsis, Chicago, Ill., assignor to Sears, Roebuck and Co., Chicago, Ill., a corporation of New York Application September 30, 1937, Serial No. 166,517

6 Claims. (Cl. 70—234)

My invention relates to locks, and has to do more particularly with a locking device which is especially adapted for bicycles. However, my invention is not restricted to such utilization and may have a wide variety of applications.

An object of my invention is to provide a locking device comprising a container mountable on the article which is to be secured, a flexible locking member such as a chain being concealed in and securely retained by the container when not in operative condition, and being also retained by the container when in operative condition.

Still another object of my invention is to provide a device of the type referred to wherein the chain may be positively secured to the chain container when in operative condition and be releasable therefrom only at the will of the owner.

A further object is to provide a container mountable on a device to be secured against movement in such manner that it may not be demounted therefrom except by unlocking and opening the container.

Another object is to provide a device of the type referred to which will be simple in construction, inexpensive to fabricate, substantially fool proof in operation, and, in general, entirely satisfactory for the purposes desired.

Various other objects and advantages will become apparent as the specification proceeds.

Referring now to the drawing forming a part of this specification and illustrating a preferred embodiment of my invention:

Fig. 1 is a fragmentary elevational view of a portion of a bicycle to which is attached in operative condition a locking device embodying my invention;

Fig. 2 is an axial sectional view through said locking device;

Fig. 3 is a top plan view of the same, a portion being broken away for clearness, and Fig. 4 is a sectional view taken substantially along the line 4—4 of Fig. 2.

In the preferred embodiment illustrated, I provide a substantially U-shaped bracket member 10 having outwardly extending flanges 12, said flanges being bored to permit the passage of screws 15. As seen best in Fig. 4, I preferably provide a pair of such screws 15 at each end of the bracket and said screws secure to the bracket 10 a channel shaped member 17. It will be noted that the heads of the screws 15 are within channel 17, so as to be normally inaccessible.

Attached to the member 17 by means which will presently be indicated is a cylindrical or barrel shaped housing or container 20 adapted to receive a flexible locking device such as a chain C. Said housing 20 is closed at one end as at 21 and open at the other end at at 22 and has a lug 24 struck inwardly from a side thereof. A substantially similar lug 25 is struck out from the channel shaped member 17 and the two lugs 24 and 25 are tapped for a screw 26, the head of which is disposed toward the open end 22 of the housing 20. A keyhole slot 28 is also provided in the side wall of the housing 20 for seating a stud or rivet 30 secured to the member 17.

The open end of the housing 20 is closed by any suitable closure means which may be locked to the housing. In my preferred embodiment I have provided a closure 33 which is a disc shaped element housing a combination lock device (not shown), said lock being manipulatable by means of a knob 35. Fixed to the casing of the closure device 33 and outwardly projected therefrom is a lip or lug 37 which extends through registering apertures 38 in the housing 20 and channel 17. Controllable by the locking mechanism within the closure 33 is a lug 40 which extends through an aperture 41 in the housing 20, said lug 40 and aperture 41 preferably being disposed diametrically opposite to the lug 37 and apertures 38. Preferably integral with the lug 40 is a finger piece 45 which extends through a slot 46 in the outer face of the device 33.

The housing 20 is provided with a pair of relatively narrow slots 47 which extend longitudinally of said housing for a relatively short distance and communicate with the open end 22 thereof. Said slots 47 are only slightly wider than the thickness of a link 50 of the chain C disposable within the housing, as seen best in Fig. 3.

The bracket 10 may be secured to any suitable element where it may be found convenient. I have shown it in Fig. 1 secured to an element 52 of a bicycle frame adjacent to the sprocket wheel 53.

When it is not desired to lock the bicycle or other article for which the lock may be used, the chain or other flexible locking member will be disposed within the container 20 and the closure 33 will be in the position shown in full lines in Fig. 2, closing the open end 22 of the container 20. Said closure 33 will be securely retained by means of the lugs 37 and 40, the latter being retained by the lock (not shown). When it is desired to use the chain for locking the bicycle or other article against theft or movement, the combination lock in the element 33 will be operated by rotating knob 35; thus releasing the lug 40 which may thereupon be moved back out of the slot 41 by manipulating the finger piece 45. The closure element 33 is then removed from the housing 20 and the chain withdrawn, excepting that the next to the last link 50 at each end of the chain is inserted within one of the slots 47, the last link 51 at each end remaining within the container 20, as seen best in Fig. 4, the chain being, of course, looped through the sprocket wheel or some other moving element of the bicycle or other device, as shown in Fig. 1. The closure 33 is then replaced on the open end of the container 20, the lug 40 moved back into the slot 41, and the combination then moved to locking condition. The bicycle or other article is then securely locked against theft or rotation.

It will be seen that it is impossible to remove my improved device from the bicycle or other article to which it may be secured without removing the closure 33, since the means by which the bracket 10 is secured is accessible only in this manner. In order to remove the device, after removal of the closure 33, the screw 26 must be removed and the container 20 removed from the channel 17 by disengaging the keyhole slot 28 from the stud 30. The screws 15 become accessible only in this manner.

It will be obvious that various other locking devices such as, for example, a key operated lock, may be used in the closure 33 for controlling the lug 40.

Various other changes and modifications coming within the spirit of my invention will doubtless suggest themselves to those skilled in the art, and hence I do not wish to be limited to the specific forms shown or uses mentioned except to the extent indicated in the appended claims, which are to be interpreted as broadly as the state of the art will permit.

I claim:

1. In a device of the class described and in combination, a bracket, a container having a lockable closure, an intermediate member partially embracing said container, means securing said bracket to said intermediate member and releasable only when the container is not secured to the latter, and means securing said container to said intermediate member and releasable only when said container is open.

2. In a device of the class described and in combination, a bracket, a flexible member, and means for coupling said member to said bracket, said means comprising a container having an open end and a lockable closure therefor, an intermediate member partially embracing said container, means securing said bracket to said intermediate member and releasable only when said container is removed, means securing said container to said intermediate member and releasable only when said closure is removed, said container having slots communicating with its open end, said flexible member being completely disposable within said container and having a thickness less than the width of each slot, and means on the ends of said flexible member having a dimension greater than the width of each slot whereby said flexible member may be extended through said slots and its ends retained within said container.

3. In a structure of the class described, means for retaining the ends of a flexible element, a releasable locking device controllable at will for securing the element to said retaining means, a separate bracket for mounting said retaining means, and means disposed substantially completely within said retaining means and securing said retaining means to said bracket, said securing means being independent of but accessible only upon release of said locking device.

4. In a device of the class described and in combination, a bracket member, an intermediate member, releasable means securing said members together and to a support, a container, releasable means securing the container to said intermediate member, and a lockable closure for said container, neither of said securing means being releasable while said closure is locked to said container.

5. In a device of the class described, a flexible element comprising a chain adapted to be passed about a hitching post or other suitable object, a container therefor, said container being permanently closed at one end and having an opening at its other end and being slotted from the edge of said opening to receive links of said chain, while other links contiguous to the aforesaid links and disposed in said container bridge and cannot pass out through the slotted portion of said container, a lockable closure for said container, and mounting means for said container, said mounting means being detachable only upon removal of said closure.

6. In a device of the class described and in combination, a bracket member, an intermediate member, releasable means securing said members together and to a support, a container, releasable means securing the container to said intermediate member, and a lockable closure for said container, neither of said securing means being releasable while said closure is locked to said container, one of said securing means being releasable only after the other securing means is released.

ARTHUR H. LIPSIS.